(12) United States Patent
Wu (10) Patent No.: US 11,467,473 B2
(45) Date of Patent: Oct. 11, 2022

(54) LENS ASSEMBLY, CAMERA MODULE, AND TERMINAL

(71) Applicant: HUAWEI TECHNOLOGIES CO., LTD., Shenzhen (CN)

(72) Inventor: Chengshiun Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 110 days.

(21) Appl. No.: 16/758,065

(22) PCT Filed: Nov. 10, 2017

(86) PCT No.: PCT/CN2017/110445
§ 371 (c)(1),
(2) Date: Apr. 22, 2020

(87) PCT Pub. No.: WO2019/090692
PCT Pub. Date: May 16, 2019

(65) Prior Publication Data
US 2020/0341351 A1 Oct. 29, 2020

(51) Int. Cl.
*G03B 17/12* (2021.01)
*G02B 7/02* (2021.01)
(Continued)

(52) U.S. Cl.
CPC ............ *G03B 17/12* (2013.01); *G02B 7/025* (2013.01); *H04N 5/2254* (2013.01); *G02B 3/0062* (2013.01)

(58) Field of Classification Search
CPC .......... G03B 17/12; G03B 3/00; G02B 7/025; G02B 3/0062; G02B 7/022; G02B 7/00;
(Continued)

(56) References Cited

U.S. PATENT DOCUMENTS

| 6,215,604 B1* | 4/2001 | Hori | G02B 7/02 |
| | | | 359/819 |
| 2004/0174618 A1* | 9/2004 | Kikuchi | G02B 7/022 |
| | | | 359/811 |

(Continued)

FOREIGN PATENT DOCUMENTS

| CN | 1396473 A | 2/2003 |
| CN | 1406432 A | 3/2003 |

(Continued)

*Primary Examiner* — Albert H Cutler
(74) *Attorney, Agent, or Firm* — Maier & Maier, PLLC (57) ABSTRACT

A lens assembly, including a lens barrel and a lens. The lens barrel is hollow and includes an interior surface, the lens is disposed inside the lens barrel, and the lens includes a side surface in interference fit with the interior surface, where the interior surface has a hollow area, the side surface includes a micro-convex structure, and the hollow area fits the micro-convex structure. A fit quantity between the micro-convex structure and the hollow area is changed through relative rotation of the lens and the lens barrel, to adjust assembly interference between the lens barrel and the lens. Embodiments further provide a camera module and a terminal, to resolve problems of lens deformation and degraded imaging quality caused by large assembly interference of the lens barrel and the lens.

17 Claims, 6 Drawing Sheets

(51) Int. Cl.
  *H04N 5/225*   (2006.01)
  *G02B 3/00*    (2006.01)
  *G02B 7/00*    (2021.01)
(58) Field of Classification Search
  CPC . G02B 3/00; G02B 7/003; G02B 7/02; G02B 7/021; G02B 13/001; G02B 13/0015; H04N 5/2254; H04N 5/2257
  See application file for complete search history.

(56) References Cited

U.S. PATENT DOCUMENTS

| | | | |
|---|---|---|---|
| 2009/0290239 A1 | 11/2009 | Wu | |
| 2010/0177409 A1* | 7/2010 | Liu | C03B 11/08 65/102 |
| 2013/0308216 A1* | 11/2013 | Matsumoto | G02B 7/022 359/829 |
| 2015/0103407 A1 | 4/2015 | Chen | |
| 2017/0078537 A1* | 3/2017 | Peddecord | G03B 17/08 |
| 2018/0205857 A1* | 7/2018 | Chan | H01L 21/561 |
| 2018/0343369 A1 | 11/2018 | Kim et al. | |

FOREIGN PATENT DOCUMENTS

| | | |
|---|---|---|
| CN | 101517448 A | 8/2009 |
| CN | 201548200 U | 8/2010 |
| CN | 203069859 U | 7/2013 |
| CN | 104570168 A | 4/2015 |
| CN | 105093467 A | 11/2015 |
| CN | 205982795 U | 2/2017 |
| CN | 206339755 U | 7/2017 |
| DE | 102007029475 A1 | 1/2009 |
| EP | 1 289 281 A1 | 3/2003 |
| EP | 2 075 610 A1 | 7/2009 |
| JP | S63131110 A | 6/1988 |
| JP | H09274125 A | 10/1997 |
| JP | H11326732 A | 11/1999 |
| JP | 2001245186 A | 9/2001 |
| JP | 2002251769 A | 9/2002 |
| JP | 2003035855 A | 2/2003 |
| JP | 2005037601 A | 2/2005 |
| JP | 2005055811 A | 3/2005 |
| JP | 2005155811 A | 6/2005 |
| JP | 2005274895 A | 10/2005 |
| JP | 2006-171171 A | 6/2006 |
| JP | 2006330116 A | 12/2006 |
| JP | 2008-296538 A | 12/2008 |
| JP | 2010204569 A | 9/2010 |
| JP | 2012194265 A | 10/2012 |
| JP | 2015215595 A | 12/2015 |
| JP | 2017003773 A | 1/2017 |
| JP | 2018116102 A | 7/2018 |
| WO | 2009000591 A1 | 12/2008 |
| WO | 2017/039292 A1 | 3/2017 |

\* cited by examiner

LENS ASSEMBLY, CAMERA MODULE, AND TERMINAL

CROSS-REFERENCE TO RELATED APPLICATIONS

This application is a National Stage of International Application No. PCT/CN2017/110445, filed on Nov. 10, 2017, which is hereby incorporated by reference in its entirety.

TECHNICAL FIELD

This application relates to the field of technologies for optical modules in camera apparatuses, and in particular, to a lens assembly.

BACKGROUND

In a lens assembly of a mobile terminal such as a digital camera, a camera device, and a mobile phone, interference is present between a lens barrel and a lens assembled within. However, excessive interference between the lens barrel and the lens may deform the lens, degrading a resolving power of the lens assembly and affecting the quality of photography. A direction of studies in the industry is how to design making the interference between the lens and the lens barrel within an expected range without causing deformation on the lens while ensuring the resolving power of the lens assembly and the quality of photography.

SUMMARY

Embodiments provide a lens assembly, a camera module, and a terminal to resolve problems of lens deformation and degraded imaging quality caused by large assembly interference between a lens barrel and a lens.

According to a first aspect, this application provides a lens assembly, including a lens barrel and a lens. The lens barrel is hollow and includes an interior surface. In an embodiment, the lens barrel has a tubular shape with openings at both ends. An accommodation space formed by the surrounding interior surface is used to install the lens. A central axis of the lens barrel is an optical axis of the lens assembly. The lens is disposed inside the lens barrel, and the lens includes a side surface in interference fit with the interior surface. For example, a central area of the lens is a light-transmitting area, an edge area of the lens surrounds the central area, and the edge area is used to assemble the lens into the lens barrel. The side surface is an exterior surface of the edge area that fits the lens barrel, and the side surface is in contact and interference fit with the interior surface of the lens barrel. The interior surface of the lens barrel has a hollow area. The hollow area may be a groove of any shape, such as a square groove, a curved groove, a semicircular groove, a triangular groove, or an irregular shape. The hollow area is a concave area formed in an inner wall of the lens barrel by removing materials. The hollow area may alternatively be an area formed by a plurality of fine-stripe channels or slits. The side surface includes a micro-convex structure, where the micro-convex structure in the side surface of the lens is an irregular surface protrusion structure that appears on the lens during processing. For example, the side surface of the lens should be theoretically designed as a cylindrical surface. However, during manufacturing, the micro-convex structure is inevitably formed on the side surface of the lens because of reasons such as mould structure and processing art. In the embodiments, a fit quantity between the micro-convex structure and the hollow area is changed through relative rotation of the lens and the lens barrel, to adjust assembly interference between the lens barrel and the lens. After the lens is installed into the lens barrel, the side surface is in interference fit with the interior surface. Relatively large interference may cause deformation of the lens and affect imaging quality. In this application, at least a portion of the micro-convex structure is moved into the hollow area by rotating the lens. That is, the hollow area absorbs some interference between the micro-convex structure and the interior surface. When the micro-convex structure is completely accommodated in the hollow area, interference between the lens and the lens barrel is minimum. In this application, an amount of deformation of the lens is controlled by reducing the interference between the lens and the lens barrel, thereby ensuring the imaging quality.

In an implementation, the hollow area is filled with a cushioning material, and the lens is in contact with the cushioning material in the hollow area, to absorb the assembly interference between the lens and the interior surface of the lens barrel. The cushioning material may be a material characterized by elastic cushioning, such as glue, foam, and silicone.

There are a plurality of hollow areas. The plurality of hollow areas are separated from each other, arranged along a periphery of the lens, and directly facing the side surface of the lens. The arranging of two or more than two hollow areas can improve efficiency of interference between the lens and a camera, so that the micro-convex structure can quickly fit a hollow area during rotation of the lens. Further, a quantity of micro-convex structures on the side surface of the lens is not limited to only one. There may be two or more micro-convex structures. In this way, two or more micro-convex structures fit two or more hollow areas, which can adjust the interference between the lens and the lens barrel to a greater extent.

In an implementation, the hollow area includes a first hollow area and a second hollow area, where the first hollow area is one or more first hollow structures, and the second hollow area is one or more second hollow structures. The lens includes a top lens, a bottom lens, and at least one middle lens stacking between the top lens and the bottom lens, where the top lens and the bottom lens are both in interference fit with the lens barrel, and the at least one middle lens is in clearance fit with the lens barrel. The at least one first hollow structure fits a micro-convex structure of the top lens, and the at least one second hollow structure fits a micro-convex structure of the bottom lens.

In this implementation, a multi-layer lens structure is determined. After positions of the top lens and the bottom lens are determined, a position of the middle lens is fixed. Therefore, clearance interference between the middle lens and the lens barrel can ensure that the middle lens is not deformed due to the assembly interference. The top lens may be a one-layer or two-layer lens structure. The bottom lens may be also a one-layer or two-layer lens structure.

In an implementation, a glue chute is arranged in the lens barrel, where the glue chute extends from an end face of the lens barrel to the hollow area, and the glue chute is configured to fill glue into the hollow area after the lens is assembled into the lens barrel. Filling glue in the glue chute can improve a strength and overall rigidity of the lens assembly, avoiding displacement or deformation of the lens.

In an implementation, the glue chute includes a first glue chute and a second glue chute, where the first glue chute extends from a top end face of the lens barrel to the hollow area that fits the top lens, and the second glue chute extends from a bottom end face of the lens barrel to the hollow area that fits the bottom lens. In this implementation, two glue chutes are provided to dispense glue for the top lens and the bottom lens so as to fill glue in the hollow area. This makes glue filling easy without affecting the middle lens.

In an implementation, a connection channel is further disposed on the inner wall of the lens barrel. The plurality of first hollow structures are connected to each other through the connection channel, and the second hollow structures are connected to each other through the connection channel.

The hollow area includes a groove or a plurality of slits that are adjacent to each other and arranged in parallel.

In an implementation, each of the plurality of slits are arranged in parallel in an axial direction of the lens barrel, and are correspondingly arranged along a peripheral of the top lens or the bottom lens.

In other words, a hollow area at one position may be a structure including a complete groove or a structure including a plurality of slits.

According to a second aspect, an embodiment further provides a camera module, including a circuit board, a chip, a light filter, and the lens assembly according to any one of the foregoing implementations, where the chip is disposed on a top surface of the circuit board, the light filter is fixed on the bottom surface of the lens barrel of the lens assembly, with the bottom surface of the lens barrel connected to the top surface of the circuit board, and the chip is disposed opposite to the lens.

According to a third aspect, an embodiment further provides a terminal, including the camera module.

BRIEF DESCRIPTION OF DRAWINGS

To describe the technical solutions in the embodiments more clearly, the following briefly describes the accompanying drawings required for describing the embodiments

DESCRIPTION OF EMBODIMENTS

The following describes the embodiments with reference to the accompanying drawings in the embodiments.

The embodiments provide a lens assembly, applied to a camera module of a terminal product. The terminal may be a mobile phone, a tablet, a video camera, or the like.

Figure 1:
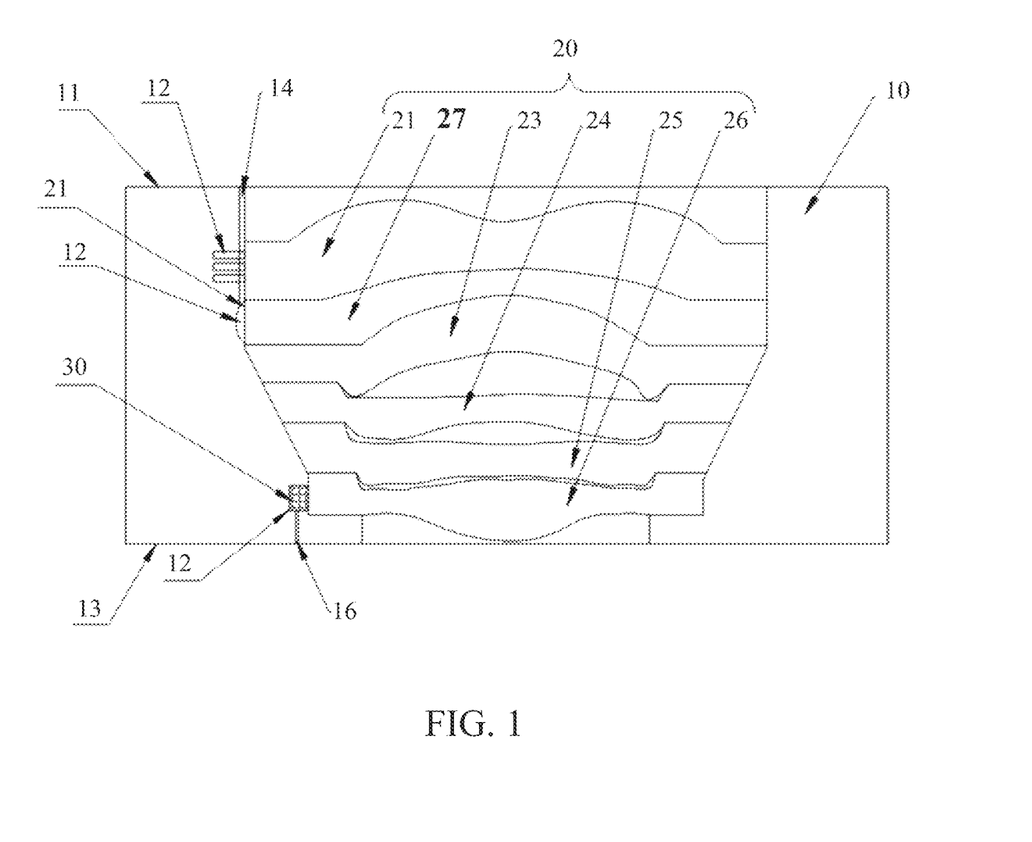
FIG. 1 is a schematic cross sectional view of a lens assembly according to an implementation.
Figure 2:
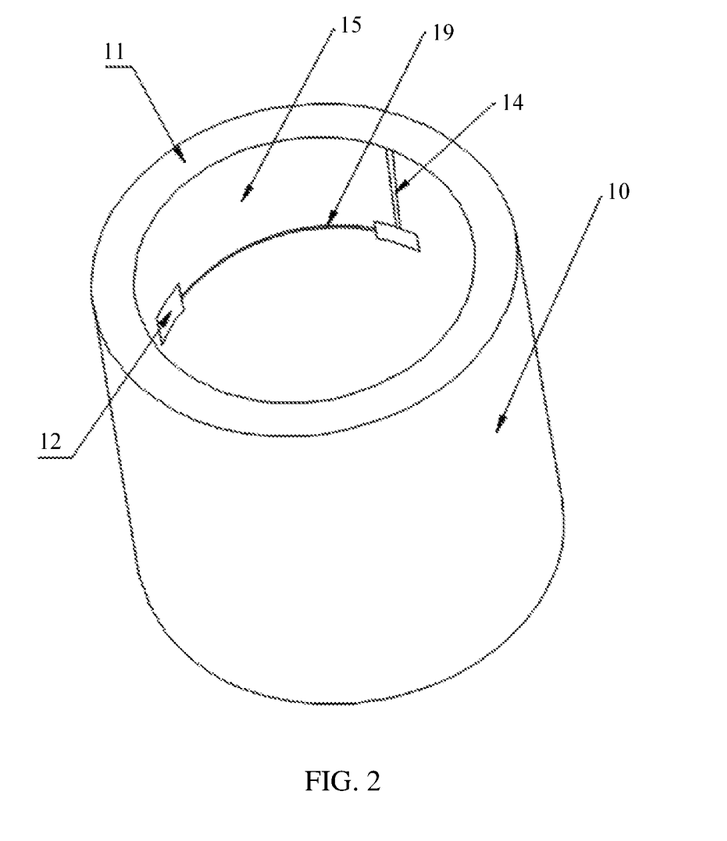
FIG. 2 is a schematic three-dimensional view of a lens barrel in a lens assembly according to an implementation.
Figure 3:
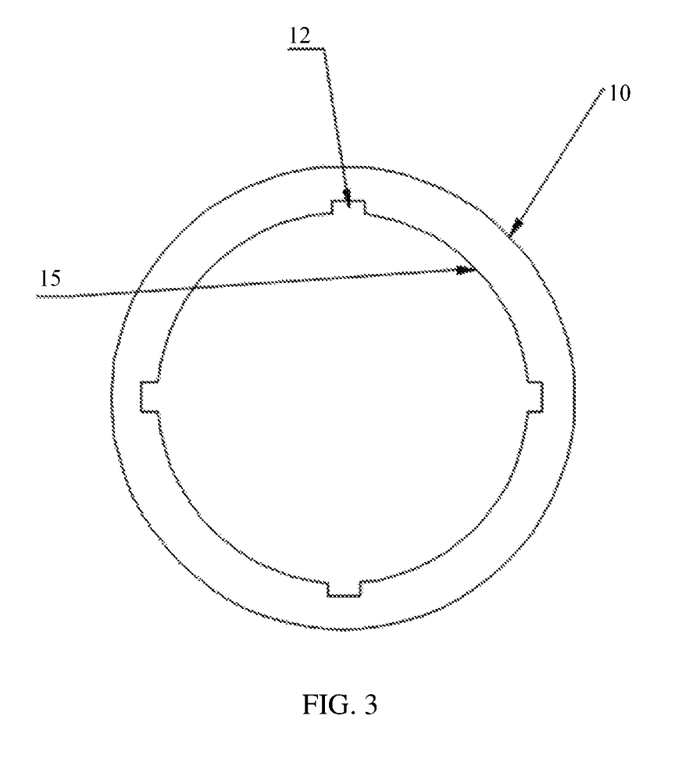
FIG. 3 is a schematic plan view of an end of a lens barrel in a lens assembly according to an implementation.

Referring to FIG. 1, FIG. 2, and FIG. 3, a lens assembly includes a lens barrel 10 and a lens 20. The lens barrel 10 is hollow and includes an interior surface 15. In the embodiment, the lens barrel 10 is in a tubular shape with openings at both ends. An accommodation space formed by the surrounding interior surface 15 is used to install the lens 20.

The lens barrel 10 includes a first end 11 and a second end 13. A central axis of the lens barrel 10 is an optical axis of the lens assembly. The lens 20 is disposed inside the lens barrel 10, and the lens 20 includes a side surface 21 in interference fit with the interior surface 15. Further, a central area of the lens 20 is a light-transmitting area, an edge area of the lens 20 surrounds the central area, and the edge area is used to assemble the lens 20 into the lens barrel 10. The side surface 21 is an exterior surface of the edge area that fits the lens barrel 10, and the side surface 21 is in contact and interference fit with the interior surface 15 of the lens barrel 10. Interference fit described in this embodiment refers to an interference fit relationship between the lens 20 and the lens barrel 10. Thus, when the lens 20 is assembled into the lens barrel 10 under action of an external force, the side surface 21 of the lens 20 presses the interior surface 15 of the lens barrel 10. A pressing force fixes the lens 20 into the lens barrel 10. The pressing also makes the lens 20 prone to be deformed. Such an installation relationship is referred to as interference fit.

The interior surface 15 of the lens barrel 10 has a hollow area 12. The hollow area 12 may be a groove of any shape, such as a square groove, a curved groove, a semicircular groove, a triangular groove, or an irregular shape. The hollow area 12 may alternatively be an area formed by a plurality of fine-stripe channels or slits. The hollow area 12 is a concave area formed in an inner wall of the lens barrel 10 by removing materials.

Figure 4:
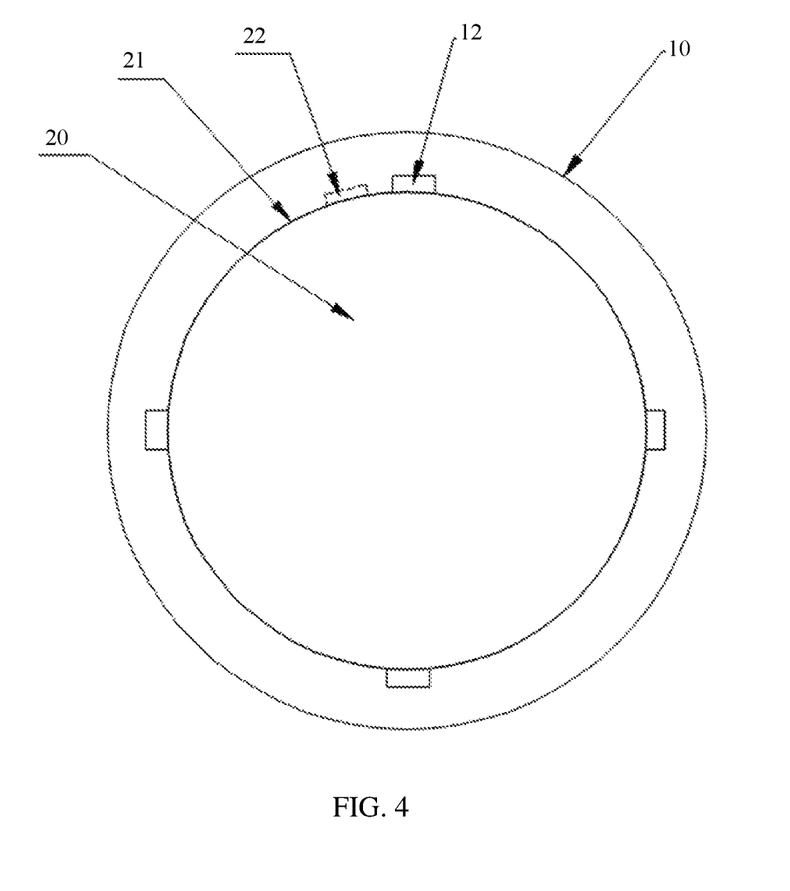
FIG. 4 is a schematic diagram of a status of assembly interference between a lens barrel and a lens in a lens assembly according to an implementation.
Figure 5:
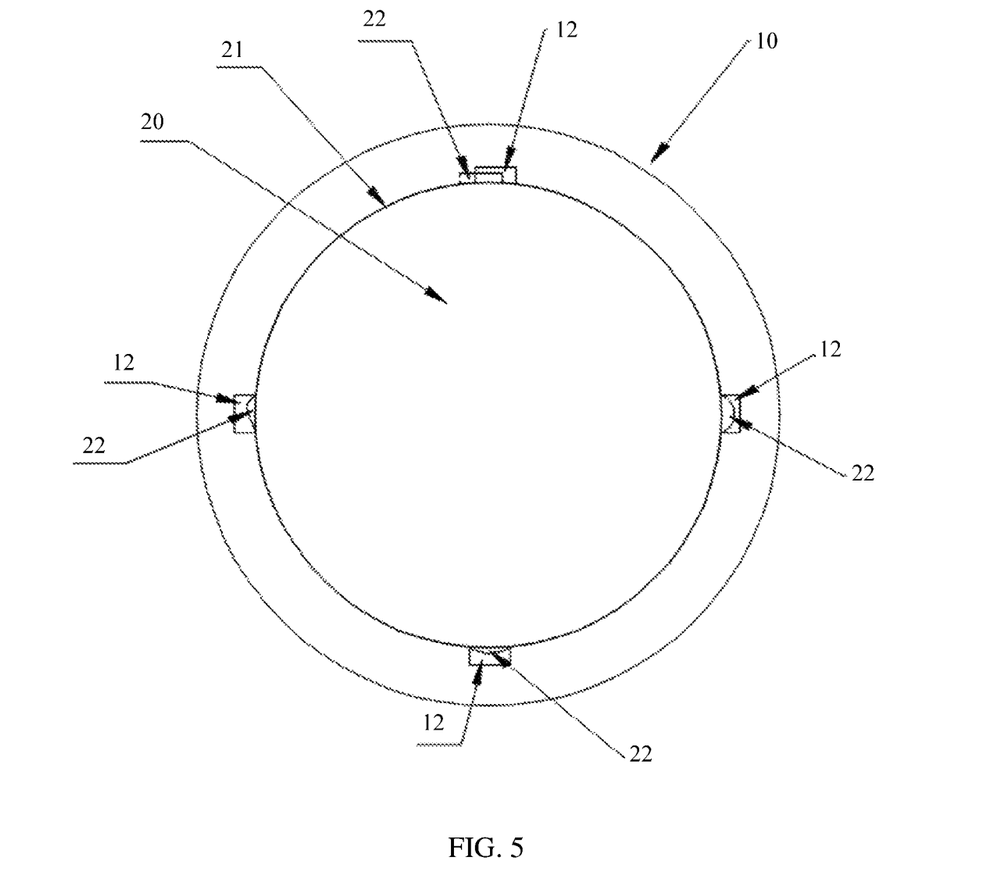
FIG. 5 is a schematic diagram of fit between a micro-convex structure of a lens and a hollow area of a lens barrel resulting from adjustment of a relative position relationship between the lens barrel and the lens based on FIG. 4.

Referring to FIG. 4 and FIG. 5, the side surface 21 of the lens 20 includes a micro-convex structure 22, where the micro-convex structure 22 in the side surface 21 of the lens 20 is an irregular surface protrusion structure that appears on the lens 20 during processing. For example, the side surface 21 of the lens 20 should be theoretically designed as a smooth cylindrical surface. However, during manufacturing, the micro-convex structure 22 is inevitably formed on the side surface 21 of the lens 20 because of reasons such as mould structure and processing art. The micro-convex structure 22 may be of any shape. In the embodiment shown in FIG. 5, the lens 20 includes micro-convex structures 22 of four different shapes.

In this application, the hollow area 12 is configured in the lens barrel 10. When the lens 20 is installed into the lens barrel 10, the lens 20 can be rotated so that the micro-convex structure 22 of the lens 20 falls in the hollow area 12. This changes a fit quantity between the micro-convex structure 22 and the lens barrel, adjusting assembly interference between the lens barrel 10 and the lens 20, that is, adjusting the pressing force between the lens barrel 10 and the lens 20.

After the lens 20 is installed into the lens barrel 10, the side surface 21 is in interference fit with the interior surface 15, causing deformation of the lens 20 and affecting imaging quality. In the embodiment shown in FIG. 4, the micro-convex structure 22 and the hollow area 12 do not intersect, and are separated from each other. In this case, interference between the micro-convex structure 22 and the interior surface 15 of the lens barrel 10 is relatively large, making the lens 20 prone to deformation. As shown in FIG. 5, the lens 20 is rotated so that at least a portion of the micro-convex structure 22 is moved into the hollow area 12. That is, the hollow area 12 absorbs some interference between the micro-convex structure 22 and the interior surface 15, to reduce the mutual pressing force between the lens barrel 10 and the lens 20. When the micro-convex structure 22 is completely accommodated in the hollow area 12, the interference between the lens 20 and the lens barrel 10 is minimal. In this embodiment, an amount of deformation of the lens 20 is controlled by reducing the interference between the lens 20 and the lens barrel 10, thereby ensuring the imaging quality.

Referring to FIG. 1, in an implementation, the hollow area 12 is filled with a cushioning material 30, and the cushioning material 30 is used to contact the lens 20 to absorb the assembly interference between the lens 20 and the interior surface 15 of the lens barrel 10. The cushioning material 30 may be a material characterized by elastic cushioning, such as glue, foam, and silicone.

Referring to FIG. 2 and FIG. 3, in an implementation, there are a plurality of hollow areas 12. The plurality of hollow areas 12 are separated from each other, arranged along a peripheral of the lens 20, and directly facing the side surface 21 of the lens 20. The arranging two or more than two hollow areas 12 can improve efficiency of interference between the lens 20 and a camera, so that the micro-convex structure 22 can quickly fit a hollow area 12 during rotation of the lens 20. Additionally, a quantity of micro-convex structures 22 on the side surface 21 of the lens 20 is not limited to only one. There may be two or more micro-convex structures 22. In this way, two or more micro-convex structures 22 fit two or more hollow areas 12, which can adjust the interference between the lens 20 and the lens barrel 10 to a greater extent.

In an implementation, the hollow area 12 includes a first hollow area and a second hollow area, where the first hollow area is one or more first hollow structures, and the second hollow area is one or more second hollow structures.

In an implementation, the lens 20 includes a top lens, a bottom lens, and at least one middle lens stacking between the top lens and the bottom lens. The at least one first hollow structure fits a micro-convex structure of the top lens, the top lens and the bottom lens are both in interference fit with the lens barrel, and the at least one second hollow structure fits a micro-convex structure of the bottom lens.

As shown in FIG. 1, the lens 20 includes a first lens 21, a second lens 27, a third lens 23, a fourth lens 24, a fifth lens 25, and a sixth lens 26 that are sequentially stacked. The first lens 21 and the second lens 27 are top lenses, the third lens 23, the fourth lens 24, and the fifth lens 25 are middle lenses, and the sixth lens 26 is a bottom lens. The hollow area 12 is distributed along a peripheral of the top lenses and the bottom lens. The middle lens is in clearance fit with the lens barrel. In this implementation, a multi-layer lens structure is determined. After positions of the top lens and the bottom lens are determined, a position of the middle lens is fixed. Therefore, the clearance interference between the middle lens and the lens barrel 10 can ensure that the middle lens is not deformed due to the assembly interference. The top lens may be a one-layer or two-layer lens structure. The bottom lens may be also a one-layer or two-layer lens structure.

In an implementation, a glue chute is arranged in the lens barrel 10, the glue chute extends from an end face of the lens barrel 10 to the hollow area 12, and the glue chute is configured to fill glue into the hollow area 12 after the lens 20 is assembled into the lens barrel 10. Filling glue in the glue chute can improve a strength and overall rigidity of the lens assembly, avoiding displacement or deformation of the lens 20.

In an implementation, the glue chute includes a first glue chute 14 and a second glue chute 16. The first glue chute 14 extends from a top end face of the lens barrel 10 to the hollow area 12 that fits the top lens (the first lens 21), and the first glue chute 14 extends to a position in the hollow area 12 that fits the first lens 21 and the second lens 27. The second glue chute 16 extends from a bottom end face of the lens barrel 10 to the hollow area 12 that fits the bottom lens (the sixth lens 26). In this implementation, two glue chutes 14 and 16 are provided to dispense glue for the top lens and the bottom lens so as to fill glue in the hollow area 12. This makes glue filling easy without affecting the middle lens 20.

As shown in FIG. 2, in an implementation, a connection channel 19 is further disposed on the inner wall of the lens barrel 10. The hollow area 12 along a periphery of the lens 20 includes at least two hollow structures, and the connection channel 19 is used to connect the at least two hollow structures.

The hollow area 12 includes a groove or a plurality of slits that are adjacent to each other and arranged in parallel. In an implementation, the hollow area 12 includes a plurality of slits that are arranged in parallel in an axial direction of the lens barrel 10, and are correspondingly arranged along a peripheral of the top lens or the bottom lens. As shown in FIG. 1, the hollow area 12 that is configured along a peripheral of the first lens 21 includes three slits arranged in parallel. In other words, a hollow area 12 at one position may be a structure including a complete groove or a structure including a plurality of slits.

Figure 6:
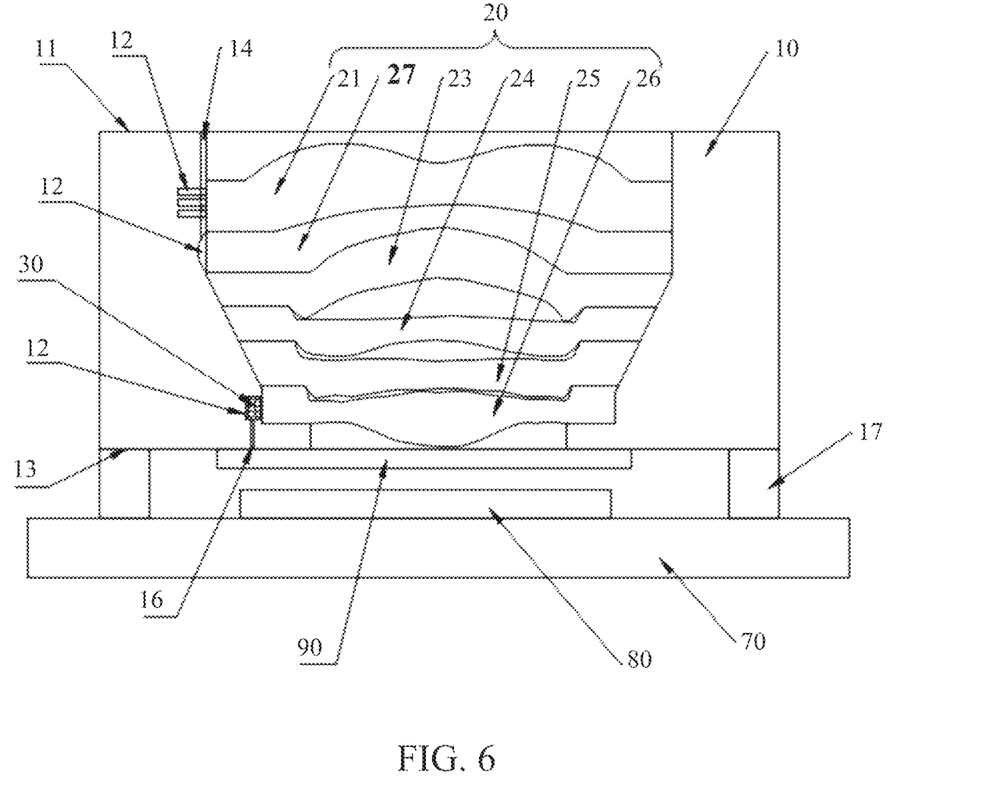
FIG. 6 is a schematic cross sectional view of a camera module according to an implementation.

Referring to FIG. 6, this application further provides a camera module, including a circuit board 70, a chip 80, a light filter 90, and a lens assembly. The chip 80 is disposed on a top surface of the circuit board 70, the light filter 90 is fixed on a bottom surface (that is, a second end face 13) of a lens barrel 10 of the lens assembly, with the bottom surface of the lens barrel 10 connected to the top surface of the circuit board 70, and the chip 80 is disposed opposite to a lens 20. A bracket 17 is arranged between the lens barrel 10 and the circuit board 70. The bracket 17 is fixedly connected between the circuit board 70 and the lens barrel 10. Adhesives may be used to fix the bracket 17 to the circuit board 70 and the bracket 17 to the lens barrel 10.

The foregoing descriptions are merely implementations of this application, but are not intended to limit the protection scope of this application. Any variation or replacement readily figured out by a person of ordinary skill in the art within the technical scope disclosed in the embodiments shall fall within the protection scope of the present invention.

What is claimed is:

1. A lens assembly applied to a mobile phone, comprising:
   a lens barrel and a lens, the lens barrel is hollow and comprises an interior surface, the lens is disposed inside the lens barrel, and the lens comprises a side surface in interference fit with the interior surface, the interior surface has a hollow area, the side surface comprises a micro-convex structure, and the hollow area fits the micro-convex structure,
   wherein the hollow area comprises a first hollow area and a second hollow area, the first hollow area is one or more first hollow structures, and the second hollow area is one or more second hollow structures;
   the lens comprises a top lens, a bottom lens, and at least one middle lens stacking between the top lens and the bottom lens, the top lens and the bottom lens are both in interference fit with the lens barrel, and the at least one middle lens is in clearance fit with the lens barrel; and
   the at least one first hollow structure fits a micro-convex structure of the top lens, and the at least one second hollow structure fits a micro-convex structure of the bottom lens.

2. The lens assembly according to claim 1, wherein a fit quantity between the micro-convex structure and the hollow area is changed through relative rotation of the lens and the lens barrel to adjust assembly interference between the lens barrel and the lens.

3. The lens assembly according to claim 1, wherein the hollow area is filled with a cushioning material, and the lens is in contact with the cushioning material in the hollow area.

4. The lens assembly according to claim 1, further comprising a glue chute arranged in the lens barrel, and the glue chute extends from an end face of the lens barrel to the hollow area.

5. The lens assembly according to claim 4, wherein the glue chute comprises a first glue chute and a second glue chute, the first glue chute extends from a top end face of the lens barrel to the hollow area that fits the top lens, and the second glue chute extends from a bottom end face of the lens barrel to the hollow area that fits the bottom lens.

6. The lens assembly according to claim 1, wherein the plurality of first hollow structures are connected to each other through a connection channel, and the second hollow structures are connected to each other through the connection channel.

7. The lens assembly according to claim 1, wherein the hollow area comprises a groove or a plurality of slits where each of the slits in the plurality of slits are adjacent to each other and arranged in parallel.

8. The lens assembly according to claim 7, wherein each of the slits in the plurality of slits are arranged in parallel in an axial direction of the lens barrel.

9. A camera module for a mobile phone, comprising:
a circuit board, a chip, a light filter, and a lens assembly, the lens assembly comprises a lens barrel and a lens, the lens barrel is hollow and comprises an interior surface, the lens is disposed inside the lens barrel, and the lens comprises a side surface in interference fit with the interior surface, the interior surface has a hollow area, the side surface comprises a micro-convex structure, and the hollow area fits the micro-convex structure;
and the chip is disposed on a top surface of the circuit board, the light filter is fixed on a bottom surface of the lens barrel of the lens assembly, with the bottom surface of the lens barrel connected to the top surface of the circuit board, and the chip is disposed opposite to the lens,
wherein the hollow area comprises a first hollow area and a second hollow area, the first hollow area is one or more first hollow structures, and the second hollow area is one or more second hollow structures;
the lens comprises a top lens, a bottom lens, and at least one middle lens stacking between the top lens and the bottom lens, the top lens and the bottom lens are both in interference fit with the lens barrel, and the at least one middle lens is in clearance fit with the lens barrel; and
the at least one first hollow structure fits a micro-convex structure of the top lens, and the at least one second hollow structure fits a micro-convex structure of the bottom lens.

10. A mobile phone, comprising a camera module comprising a circuit board, a chip, a light filter, and a lens assembly,
wherein the lens assembly comprising a lens barrel and a lens, wherein the lens barrel is hollow and comprises an interior surface, the lens is disposed inside the lens barrel, and the lens comprises a side surface in interference fit with the interior surface, wherein the interior surface has a hollow area, the side surface comprises a micro-convex structure, and the hollow area fits the micro-convex structure;
wherein the chip is disposed on a top surface of the circuit board, the light filter is fixed on a bottom surface of the lens barrel of the lens assembly, with the bottom surface of the lens barrel connected to the top surface of the circuit board, and the chip is disposed opposite to the lens,
wherein the hollow area comprises a first hollow area and a second hollow area, the first hollow area is one or more first hollow structures, and the second hollow area is one or more second hollow structures;
the lens comprises a top lens, a bottom lens, and at least one middle lens stacking between the top lens and the bottom lens, the top lens and the bottom lens are both in interference fit with the lens barrel, and the at least one middle lens is in clearance fit with the lens barrel; and
the at least one first hollow structure fits a micro-convex structure of the top lens, and the at least one second hollow structure fits a micro-convex structure of the bottom lens.

11. The mobile phone according to claim 10, wherein a fit quantity between the micro-convex structure and the hollow area is changed through relative rotation of the lens and the lens barrel to adjust assembly interference between the lens barrel and the lens.

12. The mobile phone according to claim 10, wherein the hollow area is filled with a cushioning material and the lens is in contact with the cushioning material in the hollow area.

13. The mobile phone according to claim 10, further comprising a glue chute arranged in the lens barrel, and the glue chute extends from an end face of the lens barrel to the hollow area.

14. The mobile phone according to claim 13, wherein the glue chute comprises a first glue chute and a second glue chute, the first glue chute extends from a top end face of the lens barrel to the hollow area that fits the top lens, and the second glue chute extends from a bottom end face of the lens barrel to the hollow area that fits the bottom lens.

15. The mobile phone according to claim 10, wherein the plurality of first hollow structures are connected to each other through a connection channel, and the second hollow structures are connected to each other through the connection channel.

16. The mobile phone according to claim 10, wherein the hollow area comprises a groove or a plurality of slits where each of the slits in the plurality of slits are adjacent to each other and arranged in parallel.

17. The mobile phone according to claim 16, wherein each of the slits in the plurality of slits are arranged in parallel in an axial direction of the lens barrel.

\* \* \* \* \*